United States Patent [19]

Leber et al.

[11] Patent Number: 5,171,343
[45] Date of Patent: Dec. 15, 1992

[54] METHOD FOR THE TOOL-FREE RESHAPING OF A TUBULAR BODY

[75] Inventors: Helmut Leber, Hanau; Klaus Reimann, Rodenbach, both of Fed. Rep. of Germany

[73] Assignee: Heraeus Quarzglas GmbH, Hanau, Fed. Rep. of Germany

[21] Appl. No.: 702,244

[22] Filed: May 17, 1991

[30] Foreign Application Priority Data

May 18, 1990 [DE] Fed. Rep. of Germany ....... 4016030

[51] Int. Cl.⁵ .............................................. C03B 23/04
[52] U.S. Cl. ......................................... 65/2; 65/3.11; 65/109; 65/110; 264/564
[58] Field of Search .................... 65/3.11, 2, 63, 1096, 65/110, 102, 292, 271; 264/571, 1.5, 564

[56] References Cited

U.S. PATENT DOCUMENTS

| | | | |
|---|---|---|---|
| 1,298,463 | 3/1919 | Corl et al. | 65/109 |
| 1,948,560 | 2/1934 | Borheman | 65/109 |
| 4,010,022 | 3/1977 | Shul | 65/109 |
| 4,427,717 | 1/1984 | Gauthier | 264/1.5 |
| 4,587,101 | 3/1986 | Clark et al. | 65/109 |
| 4,828,599 | 5/1989 | Sachs et al. | 65/109 |
| 4,985,185 | 1/1991 | Mayt et al. | 264/1.5 |

FOREIGN PATENT DOCUMENTS

| | | |
|---|---|---|
| 0032390 | 7/1981 | European Pat. Off. |
| 0163071 | 4/1985 | European Pat. Off. |
| 2827303 | 1/1979 | Fed. Rep. of Germany |
| 2441594 | 6/1980 | France |
| 50133504 | 10/1977 | Japan |
| 2193956A | 2/1988 | United Kingdom |

OTHER PUBLICATIONS

"Polarization characteristic of non-circular core single-mode fibers," By V. Ramaswamy, et al.-vol. 17, No. 18, 1978, pp. 3014-3017.

Primary Examiner—Robert L. Lindsay
Attorney, Agent, or Firm—Felfe & Lynch

[57] ABSTRACT

A process is known for the tool-free reshaping of a tubular hollow body of amorphous, especially vitreous material to a rod by pressure constriction wherein a pressure depression below atmospheric pressure is sustained in the tubular part by continual evacuation during the constriction, while the hollow body is continually fed horizontally, at a given speed of rotation, to a heating zone, and there its viscosity is so lowered that, as a result of the pressure difference between the absolute value of pressure below atmospheric pressure in the hollow body and the external pressure acting on the hollow body, the hollow body becomes constricted to form a rod in the closing zone and the rod is continually pulled from the closing zone at a given rotatory speed; in order by such a process to produce homogeneous, rod-shaped bodies from hollow bodies in a single procedure and at reasonable cost, the outside dimensions and inside dimensions of the hollow body, the viscosity of the vitreous material in the closing zone, the pressure difference between the absolute value of pressure below atmospheric pressure in the hollow body and the external pressure, the level of the pressure constriction, the rate of withdrawal of the rod and the rate of feed of the hollow body, as well as the rotatory speeds of the rod and hollow body, are selected such that a spur of smaller cross-sectional dimensions than those of the rod is formed in the axis of the hollow body from the closing zone in a direction contrary to the direction of withdrawal of the rod.

9 Claims, 1 Drawing Sheet

METHOD FOR THE TOOL-FREE RESHAPING OF A TUBULAR BODY

BACKGROUND OF THE INVENTION

The invention relates to a method for the tool-free reshaping of a tubular body of amorphous, especially vitreous material, to a solid rod by pressure constriction, for example, vacuum constriction or constriction due to thermal treatment, wherein a depression of pressure below atmospheric pressure is maintained in the tubular piece by continual evacuation as it closes on itself, while the hollow body is fed horizontally, in a continuous manner, with a given rotational speed, to a heating zone where its viscosity is so lowered that, due to the pressure difference between the absolute value of pressure below atmospheric pressure in the hollow body and the external pressure acting on the body, the body is constricted within a closing zone to form the rod, and the rod is continuously withdrawn from the closing zone at a given rotational speed.

Such processes are generally known and are used chiefly for constricting hollow cylinders of doped quartz glass to produce solid cylindrical preforms for fiber optic technology. The hollow cylinders are produced, for example, by the flame-hydrolytic deposition of glass particles on a mandrel, which can consist, for example, of glass, graphite or aluminum oxide, resulting in an open-pored "soot body" which is then thermally compressed. The mandrel is removed, for example, by drilling it out, etching it out, or drawing it out. To achieve a smooth and uniform inside surface, the inside of the hollow cylinder is generally smoothed or polished. To dry and clean the inner surfaces of the cylinder these are frequently treated with gases containing fluorine or chlorine, as disclosed for example in French examined and published patent application 2,441,594, to remove volatile halides and thereby etch away the surfaces. On account of their chemical reactivity these cleaning and drying gases, however, attack all other surfaces, e.g., those of the furnace, and they are extremely toxic.

It is known from German Patent 28 27 303 that the constricting process is facilitated and accelerated by applying a vacuum in the hollow cylinder. As the tube walls close up in the closing zone under a vacuum they move more rapidly toward one another due to forces produced by the vacuum which act radially inwardly, so that random asymmetries in the geometry of the tube can result in premature, irreversible contact between confronting walls, leading to flattening and distortion in the core area of the rod. For example, it is stated in "Polarization characteristic of non-circular core single-mode fibers," by V. Ramaswamy, W. G. French and R. D. Standley, Applied Optics, Vol. 17 No. 18, 1978, pages 3014 to 3017, that a high vacuum causes a dumbbell-shaped deformation and a low vacuum causes an oval deformation of the core region. In European Patent 0 032 390 there is described the production of a polarizing fiber optic with an oval cross section in the core region. To obtain the oval shape in the core region, vacuums of about $-0.1$ mbar to $-2$ mbar below the external pressure acting on the cylinder are maintained during the constriction of hollow cylinders of doped quartz glass with outside diameters of about 20 mm and inside diameters of about 17 mm. In the process described, the entire inside surface of the hollow cylinder is replicated at the center of the solid cylinder after constriction. Inevitable centers of distribution on the inside surface of the hollow cylinder due to impurities, moisture, surface defects, or to the fact that a surface layer always has a different stoichiometry than the solid material, lead to inhomogeneities in the center of the rod, where they are particularly undesirable in general.

An object of the present invention is therefore to devise a process for making uniform, rod-shaped bodies from hollow bodies in a single operation, at low cost and in a tool-free manner.

SUMMARY OF THE INVENTION

The above object is accomplished in accordance with the present invention in the process described above by the fact that the outside dimensions and inside dimensions of the hollow body, the viscosity of the vitreous material in the closing zone, the difference between the absolute value of pressure below atmospheric pressure within the hollow body and the external pressure thereon, the level of the pressure constriction, the rate at which the rod is drawn, and the rate of feed of the hollow body as well as the speeds of the rotation of the rod and hollow body are chosen such that a spur of smaller cross sectional dimensions than those of the rod is formed from the closing zone in the axis of the hollow body, in the direction opposite the direction in which the rod is drawn.

The fact that the geometry of the hollow body and the process parameters in the closing zone are adjusted such that a spur is formed from the closing zone in the axis of the hollow body in the direction in which the rod is formed, forestalls any premature meeting of confronting inside wall surfaces of the hollow body due to forces acting radially inwardly due to the pressure constriction, resulting in flattening and distortion of the core area. The spur that forms thus stabilizes the symmetry of the melting hollow body directly ahead of the closing zone and facilitates its incorporation into the rod. At the same time the material of the inside surface stratum of the hollow body is turned about and removed from the closing zone in the spur that is formed. Since the center of the rod thus contains no material that formerly had formed a surface, all of the important disturbances and effects due to surface flaws are forestalled.

For the achievement of these advantages it matters not whether the hollow body is fed into a stationary heating zone or the heating zone is moved past a stationary hollow body.

The process according to the invention has proven especially desirable for the treatment of hollow cylinders. A hollow body geometry has proven advantageous in which the inside diameter is between 10 mm and 120 mm and the ratio of outside to inside diameter ranges from 1.5 to 3. Since the constriction is to take place as rapidly as possible, the temperature in the heating zone is preferably set so high that in the closing zone the viscosity of the vitreous material will range from $10^3$ dPa s to $10^7$ dPa s. For the reduced pressure in the tube, which is co-determinant of the speed with which the spur is formed and of the mass of material used in building up the spur, values up to a maximum of 1008 mbar have proven suitable, while the difference between the absolute value of pressure below atmospheric pressure within the hollow body and the external pressure acting on the hollow body of between 5 mbar and 813 mbar is selected such that the hollow body will not be uncontrollably deformed in the heating zone. In order to achieve an economical mass throughput while nevertheless providing for sufficient heating of the material and sufficient thermal stability in the closing zone, it has been found satisfactory to provide for a rate of withdrawal of the rod from the closing zone between 10 mm/min and 80 mm/min, with a feed of the hollow body to the heating zone between 8 mm/min and 35 mm/min. The spur in the center of the hollow body is stabilized by the rotation of the hollow body and rod. Preferably the rotation of the rod is set to a value between 0 rpm and a maximum of 30 rpm and that of the hollow body to a value between 10 rpm and 30 rpm. The hollow body and rod rotate advantageously in the same direction.

To prevent undesirable deformation of the rod it is advantageous to keep a tension on the rod and hollow body, while making the rate of feed of the hollow body lower than the rate of withdrawal of the rod.

To assure sufficient thermal stability in the closing zone it has been found desirable to heat the hollow body and rod with an electrical heater, especially a resistance furnace closely encircling the closing zone. Instead of the preferred electrical heating, heating of the hollow body and rod by means of gas burners can be employed, especially when the hollow cylinder's dimensions are small.

To improve the homogeneity of the material it has proven advantageous to rotate the hollow body and rod at different rates of speed. Any bubbles that may be present can thus be driven into the marginal zones of the rod.

In has proven desirable to heat-treat the rod after constriction is completed. Inhomogeneities of the material caused by internal tensions can thus be removed.

The process has proven effective especially in the shaping of hollow bodies of quartz glass, and control is facilitated by the fact that the viscosity of quartz glass is less dependent on temperature.

For the deformation of hollow cylinders of quartz glass the following parameters have proven desirable for the process according to the invention: A hollow-body geometry has proven desirable in which the inside diameter is between 40 mm and 100 mm and the ratio of outside to inside diameter is between 1.7 and 3. Since the constriction is to be performed as rapidly as possible the temperature in the heating zone is preferably set so that in the closing zone the viscosity of the vitreous material will be in the range of $10^4$ dPa s to $10^7$ dPa s. For the pressure constriction in the tube, which is co-determinant of the rate at which the spur is formed and of the mass of material consumed in building the spur, values up to a maximum of 993 mbar have proven desirable, the difference between the absolute value of pressure below atmospheric pressure within the tube and the external pressure acting on the hollow body at levels between 20 mbar and 813 mbar being selected so low that the hollow body will not be deformed uncontrollably in the heating zone. In order to achieve an economical mass throughput while nevertheless providing for sufficient heating of the material and sufficient thermal stability in the closing zone, a rate of the withdrawal of the rod from the closing zone between 15 mm/min and 80 mm/min and a feed of the hollow body to the heating zone between 12 mm/min and 29 mm/min have proven satisfactory. The spur in the center of the hollow body is stabilized by the rotation of the hollow body and rod. Preferably the rotation of the rod is set to a maximum of 30 rpm and that of the hollow body to a value between 10 rpm and 30 rpm.

DESCRIPTION OF THE PREFERRED EMBODIMENTS

Figure 1:
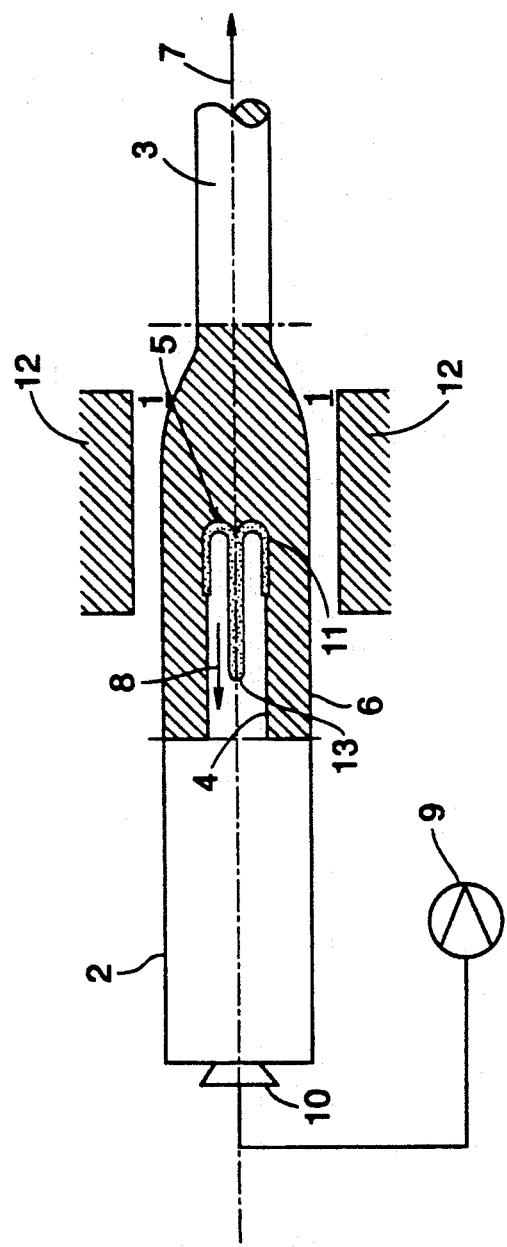

The process according to the invention will now be described by way of example with the aid of a diagram. It is to be understood, however, that this example is for illustrative purposes only and is not intended to limit the scope of the specification and the claims in any way.

The number 12 designates an electrical heater encircling the heating zone 1 covering a section of a quartz glass tube 2 and an already formed rod 3. The inner walls 4 of the quartz glass tube 2 come together in a closing zone 5 within the heating zone 1, while a spur 6 is formed and is drawn out of the closing zone 5 in a direction opposite that of the drawing of the rod 3. The direction of withdrawal of the rod 3 is indicated by the arrow 7, and that of the spur by the arrow 8. The quartz glass tube 2 is closed at its end remote from the closing zone 5 by a plug 10. Inside of the quartz glass tube 2 a constriction of 900 mbar is maintained by a vacuum pump 9 which is connected to the quartz glass tube 2 by a vacuum-tight tube passed through the plug 10. The quartz glass tube 2, which has an outside diameter of 120 mm and an inside diameter of 60 mm, is disposed horizontally and fed to the heating zone 1 at a rate of 23 mm/min with continuous rotation at 20 rpm, and there it is heated to a temperature of 2100° C. In the closing zone 5 the quartz glass has an average viscosity of $10^5$ dPa s. While the constriction is in progress the vacuum pump 9 maintains a constriction of 900 mbar in the quartz glass tube 2, so that a pressure difference from the atmospheric pressure acting on the surface of the quartz glass tube 2 of 113 mbar is maintained. The rate of withdrawal of the rod 3 amounts to 23.5 mm/min and is thus slightly faster than the feed of the quartz glass tube 2. Thus the quartz glass tube 2 and the quartz glass rod 3 are held constantly in tension. The rotational speed of the rod 3 is set slightly lower at 5 rpm than that of the quartz glass tube 2, so that an intimate mixing and homogenization of the quartz glass is achieved in the closing zone 5.

On the basis of the experimental parameters given above, a spur 6 forms in the axis of the quartz glass tube 2, which is composed of material from the regions 11 close to the surface of the inner walls 4 of the quartz glass tube 2, which have such a low viscosity in the closing zone 5 that they are deformed by the pressure and vacuum forces acting in the axial direction opposite the direction of withdrawal of the rod 3 and on the end 13 of the spur 6, and they are turned inside-out in the direction of spur growth 8. Thus the contamination and disturbances of the surface regions 11 are removed from the closing zone 5 with the spur 6. Furthermore, the formation of the spur 6 prevents the inside walls 4 of the quartz glass tube 2 from meeting, so that the symmetry of the quartz glass tube 2 is stabilized directly ahead of the closing zone 5 and transferred to the rod 3.

What is claimed is:

1. A process for tool-free reshaping of a tubular hollow body-shaped article of a material selected from the group consisting of amorphous and vitreous material having outside dimensions and inside dimensions into a rod-shaped article by pressure constriction, wherein a subatmospheric pressure is maintained within the tubular hollow body-shaped article by continuous evacuation while continuously feeding said hollow body-shaped article in a horizontal position to a heating zone at a first speed, and while simultaneously rotating said hollow body-shaped article at a first rotational speed, to effectively lower the viscosity of said material of said hollow body-shaped article, and such that due to an effective difference in pressure between a value of the absolute pressure below atmospheric pressure within the hollow body-shaped article and a value of external pressure acting on the hollow body-shaped article, said hollow body-shaped article is constricted in a closing portion of said article to form said rod-shaped article, and wherein said rod-shaped article is continuously drawn away from said closing portion at a second speed and at a second rotational speed, and wherein said outside dimensions and inside dimensions of said tubular hollow body-shaped article; said viscosity of the material of said closing portion of said article; said effective difference in pressure between the absolute pressure below atmospheric pressure within the hollow body-shaped article and the external pressure acting on the hollow body-shaped article; said first speed of feeding said hollow body-shaped article; said first rotational speed; said second speed of withdrawing the rod-shaped article; and said second rotational speed, are effective to form a spur of smaller-cross sectional dimensions than those of the rod-shaped article in the closing portion, wherein said spur is formed from the closing portion of the hollow body-shaped article in the axis of the hollow body in a direction opposite the direction of withdrawal of the rod-shaped article.

2. Process according to claim 1, wherein the rod-shaped article and the hollow body-shaped article a are held in tension.

3. Process according to claim 1, wherein the hollow body-shaped article and the rod-shaped article are rotated at different speeds.

4. Process according to claim 1, wherein the rod-shaped article is heat-treated.

5. Process according to claim 1, wherein the hollow body-shaped article and the rod-shaped article are heated in the heating zone by means of an electrical heater.

6. Process according to claim 5, wherein the heating zone is encircled by a resistance furnace.

7. Process according to claim 1, wherein the hollow body-shaped article consists substantially of quartz glass.

8. Process according to claims 1,2,3,4,5,6, or 7, wherein the hollow body-shaped article is a cylindrical hollow body with an inside diameter in the range of 40 mm to 100 mm, the ratio of outside to inside diameter ranges from 1.7 to 3, the viscosity of the material in the closing portion of said article ranges from $10^4$ dPa s to $10^7$ dPa s, the value of absolute pressure below atmospheric pressure in the hollow body-shaped article is at a maximum value of 993 mbar, and the pressure difference is in the range of 20 mbar to 813 mbar, the rate of withdrawal of the rod-shaped article is between 15 mm/min and 80 mm/min and the rate of feed of the hollow body-shaped article is between 12 mm/min and 29 mm/min, the rod-shaped article is rotated on its longitudinal axis at a maximum second rotational speed of 30 rpm and the hollow body-shaped article is rotated at a first rotational speed in the range of 10 rpm to 30 rpm.

9. Process according to claims 1,2,3,4,5,6, or 7 wherein the hollow body-shaped article is a cylindrical hollow body with an inside diameter in the range of 10 mm to 120 mm, the ratio of outside to inside diameter ranges from 1.5 to 3, the viscosity of the material in the closing portion of the article ranges from $10^3$ dPa s to $10^7$ dPa s, the value of absolute pressure below atmospheric pressure in the hollow body-shaped article is at a maximum level of 1008 mbar, and the pressure difference at a level of 5 to 813 mbar, the rate of withdrawal of the rod-shaped article is between 10 mm/min and 80 mm/min and the rate of feed of the hollow body-shaped article ranges between 8 mm/min and 35 mm/min, the rod-shaped article is rotated about its longitudinal axis at a second rotational speed between 0 rpm and 30 rpm, and the hollow body-shaped article is rotated at a first rotational speed in the range from 10 rpm to 30 rpm about its longitudinal axis.

* * * * *